United States Patent [19]

Fior

[11] 4,388,978
[45] Jun. 21, 1983

[54] SUSPENSION SYSTEM FOR CYCLES AND IN PARTICULAR FOR MOTORCYCLES

[76] Inventor: Claude Fior, 12, avenue de l'Adour, Nogaro 32110, France

[21] Appl. No.: 230,017

[22] Filed: Jan. 30, 1981

[51] Int. Cl.³ .............................................. B62K 25/04
[52] U.S. Cl. .................................... 180/219; 280/275; 280/276; 280/283
[58] Field of Search ................ 180/219, 227; 280/275, 280/276, 279, 283, 284

[56] References Cited

U.S. PATENT DOCUMENTS

| | | | |
|---|---|---|---|
| 3,917,313 | 11/1975 | Smith et al. | 280/284 |
| 4,179,135 | 12/1979 | Slater | 280/276 |
| 4,212,481 | 7/1980 | Ribi | 280/276 |
| 4,265,329 | 5/1981 | de Cortanze | 280/284 |

FOREIGN PATENT DOCUMENTS

| | | |
|---|---|---|
| 2418141 | 2/1978 | France . |
| 2418742 | 3/1978 | France . |
| 2431416 | 7/1978 | France . |

*Primary Examiner*—David M. Mitchell
*Assistant Examiner*—Donn McGiehan

*Attorney, Agent, or Firm*—Sandler & Greenblum

[57] ABSTRACT

A vehicle suspension system for the chassis of motorcycles and like vehicles comprising:
 (a) a support frame adapted to receive a wheel axle at the lower portion thereof, and being movably mounted with respect to the chassis both in the longitudinal median plane of the cycle as a result of movement of the suspension system as well as in rotation around an axis for steering;
 (b) upper and lower frames for controlling the position of the support frame in the longitudinal median support plane positioned between the chassis and the support frame;
 (c) a shock absorber positioned to elastically maintain the support frame with respect to the chassis in the longitudinal median plane whereby the wheel axle moves along a trajectory determined by the frames as a function of the forces being exerted on the cycle; and
 (d) an independent mechanical element connecting the support frame to handlebars, and being independent of the frames to allow control of the rotational position of the support frames around its axis.

14 Claims, 8 Drawing Figures

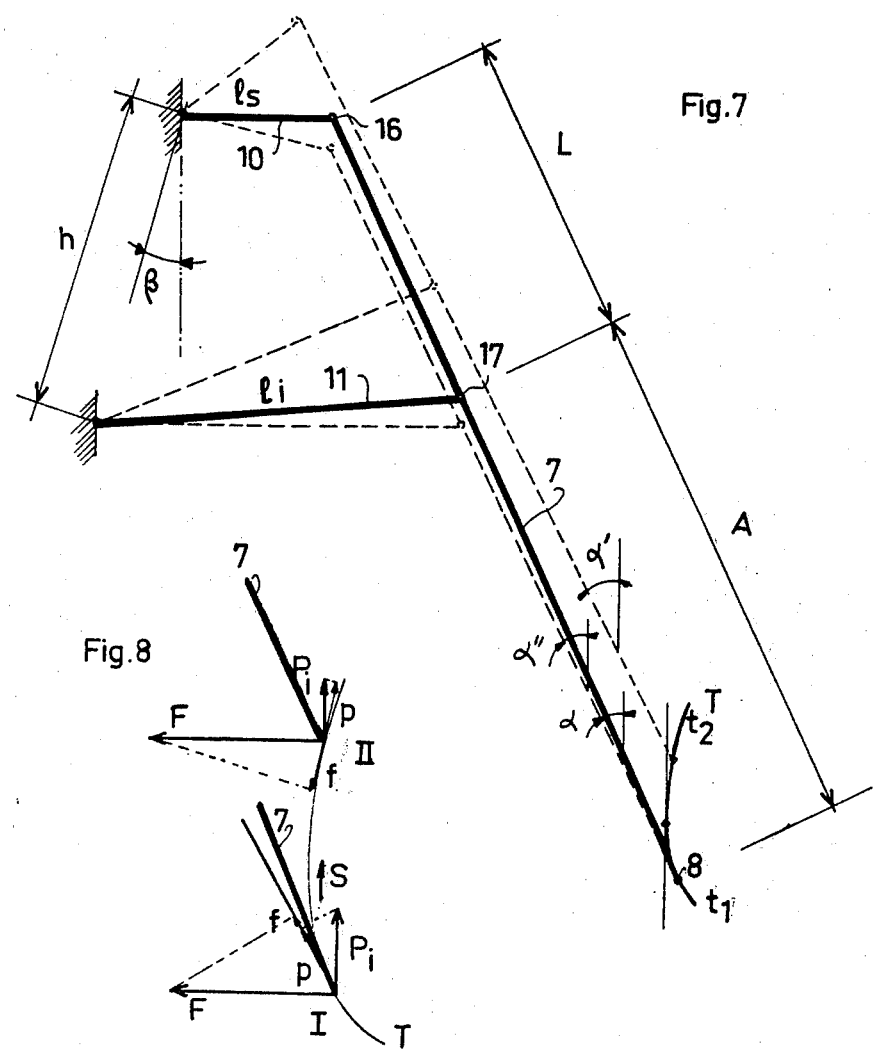

SUSPENSION SYSTEM FOR CYCLES AND IN PARTICULAR FOR MOTORCYCLES

BACKGROUND OF THE INVENTION

1. Field of the Invention

The invention relates to a front suspension system for cycles, and finds particular application to motorcycles, although it can be used for other types of cycles, scooters, motorized bicycles, etc.

2. Description of Prior Art

Several types of front suspensions for motorcycles are known. The type of suspension which is by far most popular is the telescopic fork system which comprises a fork connected on top to a steering column and comprises, at the lower portion, two tubes on which two shock absorber casings slide. Other systems have been used, but have been, as of this time, practically abandoned, such as parallelogram forks or balancing forks.

All of the above systems suffer from the major disadvantage arising from their imperfect behavior during braking. This disadvantage is analyzed below with reference to FIGS. 1, 2, and 3 of the drawings. As may be seen from FIG. 1, a chassis 1 of a conventional motorcycle is schematically shown, which comprises a steering column 2 in front and a telescopic fork 3, at the bottom of which is journalled the axle of the front wheel O. In the rest position, or when the motorcycle travels along a straight line at a constant speed, the resultant of the gravitational forces $P_r$ is a vertical force directed downwardly which applies itself at the center of gravity G of the vehicle. This force is equilibrated by two vertical reaction forces P and P' directed upwardly, which apply themselves on the axles of the front and rear wheels. The motorcycle includes a line called the average attitude L, which is substantially horizontal. It is known that the center angle is defined as the angle $\alpha$ which the axis, around which the rotations making it possible to steer the vehicle forms with the vertical. In the case illustrated, this angle is defined by the inclination of the steering column 2, and is related to the inclination towards the rear of the telescopic fork 3.

FIG. 2 schematically illustrates the front of the motorcycle with its medium attitude line L at rest. When the driver exercises a relatively powerful braking action, two effects are noted: In the first place, a mass transfer occurs towards the front and overloads the front wheel, which results in the appearance of a supplementary reaction force $P_i$ on the front axle O, which assures a new equilibrium. The front shock absorbers are compressed, and the motorcycle inclines itself strongly frontwardly, with a new attitude line L'. With respect to a reference point moving with the motorcycle, the front wheel appears to have undergone a displacement towards the rear, and the front point C of the chassis is displaced downwardly, as shown in FIG. 2. The caster angle of $\alpha_2$ is strongly diminished.

The braking furthermore results in the creation of a horizontal braking force F, which applies itself on the axle of the front wheel O and is directed towards the rear. This force F tends to increase the compression of the front suspension and the rocking of the motorcycle. To allow for a better understanding of this phenomenon, it may be imagined that the front point C of the chassis has a fixed position. FIG. 3 has been drawn using this reference system showing the trajectory $\theta$ of the front axle O in the course of suspension movements. This trajectory $\theta$ is directed towards the rear and upwardly in the case of telescopic suspensions (which takes into account the fact that an increased braking causes a displacement of the axis O towards the rear and a raising of this axis with respect to the chassis, this, in the reference system referred to above where C is taken to be fixed. Of course, since in reality it is the ground which constitutes the horizontal fixed reference, this raising of the point O occurs, in fact, by a descent of the chassis towards the ground).

As may be seen from FIG. 3, the projection f of the braking force F on the tangent to the trajectory $\theta$ is oriented in the same direction as the projection p of the weight overload $P_i$ and adds itself thus to this latter to cause the displacement towards the rear and upwardly of the point O on the curve $\theta$. This illustration of the phenomenon explains the very strong variation of attitude which occurs in practice on known motorcycles during a powerful braking, and which is accompanied by a strong diminution of the caster angle $\alpha$. The equilibrium occurs on the trajectory $\theta$ as a function of the braking power when the supplemental return force developed by the shock absorbers in the compressed state has a projection on the tangent to the curve $\theta$ sufficient to equilibrate the projections p and f.

The substantial variations of the attitude of the motorcycle and of its caster angle during braking represent a very serious defect in practice. They occur, in effect, when the motorcyclist has initiated a braking action, and thus at the most critical moments. In the first place, they involve rocking movements of the driver with possible oscillations.

It should be noted that these very annoying movements appear with notable amplitude in the case where the braking occurs upon entering a curve. In effect, when turning, the motorcycle is subjected to a supplementary force constituted by the centrifugal force which, as with the gravitational forces, applies itself in a uniform fashion to the entire motorcycle body without any transfer of mass. This force tends to lower the attitude line of the motorcycle while maintaining it parallel to itself. The attitude of the motorcycle during turning is thus very different from the attitude in the course of braking. As a result, at the end of the braking phase, when the motorcycle begins to turn, it undergoes a sudden variation of attitude to pass from the braking attitude to the curving attitude which is particularly annoying at the instant when the cyclist is negotiating a curve.

Furthermore, as has been seen, the caster angle is diminished considerably in the course of braking. Yet, it is known that, for a motorcycle, the lower its caster angle the more unstable it is, such that, at the critical braking moment, the change of attitude of the motorcycle is accompanied by greater instability.

Furthermore, changes of attitude are accompanied by variations in load on the tires with an accompanying risk of loss of traction.

Attempts have been made to reduce the amplitude of these changes of attitude by systems known as "anti-dive" systems. In general, these systems consist of adding a damping control circuit to the braking circuit which, in the course of braking, blocks the displacement of the axle of the wheel with respect to the chassis above a predetermined level. However, these relatively complex systems suffer from the serious inconvenience of totally suppressing the benefit of the suspension when they are blocked, such that the motorcycle no longer has the ability to elastically absorb the shocks imposed by the irregularities of the ground, and to soften these effects as felt by the driver.

SUMMARY OF THE INVENTION

It is, therefore, an essential object of the present invention to reduce the variations of attitude and the variations of caster angle of a motorcycle, and more generally of a cycle, while nevertheless allowing elastic shock absorber means of the suspension to function properly.

Another object of the invention is to prepare the motorcycle, in the course of the braking phase for banking or turning, by imposing an attitude on the vehicle in the course of braking which is close to the banking or turning attitude or which even coincides substantially therewith.

Furthermore, the known telescopic suspensions have other defects, resulting from the fact that the assembly of suspension elements are connected to the steering column and are mounted thereon and pivot with respect to the chassis to allow for the transmission of piloting maneuvers to the front wheel. This arrangement results in a direct transmission to the arms of the driver of the suspension movements through the steering column and the handlebars. Furthermore, this arrangement results in a certain inertia in the piloting maneuvers because the driver must rotate a relatively heavy assembly to direct his vehicle.

Another objective of the invention is to overcome these defects, on the one hand, by avoiding the direct transmission of the suspension movements to the handlebars while nevertheless considerably reducing the weight of the elements which must be directed to steer the motorcycle.

Furthermore, the conventional suspensions of motorcycles do not allow for the easy adjustment of the caster angle. This angle is, in general, dictated by construction, and cannot be adjusted by the driver as a function of the anticipated utilization of the machine. Yet, it is known that the maneuverability of a vehicle varies inversely with respect to its caster angle. A large caster angle (the steering column being very inclined) corresponds to low maneuverability. Furthermore, as has been previously indicated, the stability varies directly with the caster angle, such that the choice of a caster angle by the designer results from a compromise between these two qualities, which finally fixes the characteristics of the motorcycle. Thus, motorcycles having a substantial caster angle are well adapted for fast courses which demand good stability without demanding high maneuverability qualities; on the contrary, these motorcycles are poorly adapted for winding and slow courses which require the opposite qualities.

Another object of the present invention is to provide the driver with the ability to carry out a preliminary adjustment of the caster angle of his motorcycle, in a fashion so as to adapt the motorcycle to the type of utilization which he envisions. Thus, a given motorcycle will benefit to a certain extent, from a universal characteristic by virtue of this possibility of modifying the maneuverability/stability balance, this balance not being predetermined and fixed during construction.

Furthermore, conventional telescopic suspension forks suffer from another defect. Under frontward rocking forces, these forks undergo stresses of flexion which, despite the precise adjustment of the tubes and sliding casings of the shock absorber elements, can result in the shock absorbers being crushed with a blockage of the suspension movements well before the end of the extent of movement. During powerful braking, one thus loses the benefits of the suspension, and the flexibility provided thereby, while the shock absorber elements subjected to the elevated flexion stresses undergo relatively rapid wear and require careful maintenance.

One of the objects of the invention is to minimize this defect by providing a suspension system in which the shock absorber elements are not subjected to substantial flexional stresses.

Another object of the invention is also to furnish a method of mounting shock absorbers which makes it possible for them to assure a progressive cushioning, such that these shock absorbers are both adapted to accomodate very high loads, as well as being adapted to exhibit great flexibility under low loads.

To simplify the description, the following conventions have been adopted:

The terms "front" and "rear" refer to the normal direction of movement of the cycle.

The "longitudinal median plane" of the cycle is defined as the average or middle plane containing the front and rear cycle wheels (this plane being vertical when the cycle moves along a straight line).

The "transverse direction" is the direction perpendicular to the longitudinal median plane. A transverse plane is a plane containing a transverse direction (therefore orthogonal to the longitudinal median plane).

The "caster angle" is defined in the usual sense as the angle formed between the vertical and the axis around which rotation occurs for steering the vehicle.

The "rest position" or "rest attitude" of the cycle is the position of the cycle when it is subjected only to the forces of gravity (at stop or at a constant speed and in a straight line).

The trajectory of the axle of the front wheel which is discussed below is defined as the geometric location of the axle in the longitudinal median plane view from a reference system linked to the chassis.

By "length" of an element or "distance" between two points, it is understood the length of the projection of this element on the median longitudinal plane or the distance separating the projection of the two points on this plane.

According to the present invention, the suspension system adapted to be mounted in front of a cycle chassis, and in particular a motorcycle chassis, comprises:

(a) A wheel support frame at the lower portion of which is journalled an axle of the front wheel. This support frame is movably mounted with respect to the chassis, on the one hand, in the longitudinal median plane of the cycle as a result of the suspension movements, and on the other hand, in rotation around an axis as a result of steering maneuvers;

(b) Control means for controlling the position of the support frame in the median longitudinal plane. These control means are interposed between the chassis and the support frame, and are adapted to guide the displacements of the support frame in this plane in the course of the suspension movements;

(c) Shock absorber means positioned to elastically maintain the support frame with respect to the chassis in the longitudinal plane mentioned above in a fashion so as to position the axle of the front wheel at a predetermined position on the trajectory imposed by the control means. This position is a function of the forces exerted on the cycle; and (d) An independent mechanical element connecting the support frame to handlebars whose direction is maneuverable. This element is independent of the control means and is adapted to allow for the control of the angular position of the support frame around its axis, without activating the control means.

According to one preferred embodiment of the invention, the control means comprise an upper frame journalled on the chassis so as to be able to turn around a transverse axis and a lower frame journalled on the chassis at a lower level with respect to the upper frame so as to be able to turn around another transverse axis. The support frame is journalled in front of the upper and lower frames by swivel joint journals positioned at two different levels in a fashion so as to form a deformable quadrilateral with the upper and lower frames and with the chassis.

Furthermore, the mechanical element connecting the support frame to the handlebars can very simply be constituted by a connecting rod journalled, on the one hand, at the rear, on a flap or bracket integral with a direction axle carrying the handlebars, and on the other hand, in front, on a flap or bracket integral with the support frame.

According to another characteristic of the invention, the shock absorber means can include a shock absorber positioned to be supported by the chassis and to elastically support one of the upper or lower frames, in particular the lower frame, as will be seen below.

Furthermore, according to yet another characteristic of the invention, the means for controlling the position of the support frame in the longitudinal median plane is adapted to guide the displacements of the support frame in this plane in the course of the suspension movements such that the front wheel axle is displaced with respect to the chassis taken as a fixed reference point, along a trajectory T having a substantially vertical portion. Preferably, these control means will be interconnected such that the trajectory assumes approximately the general form of a C with an ascending portion directed to the rear, an ascending portion substantially vertical, and an ascending portion directed toward the front.

BRIEF DESCRIPTION OF THE DRAWINGS

The results and advantages arising from the invention will be better understood with reference to the description which follows and upon examination of the annexed drawings, in which:

FIGS. 7 and 8 are explanatory schematic diagrams illustrating the operation of the system.

DESCRIPTION OF PREFERRED EMBODIMENTS

Figure 1:
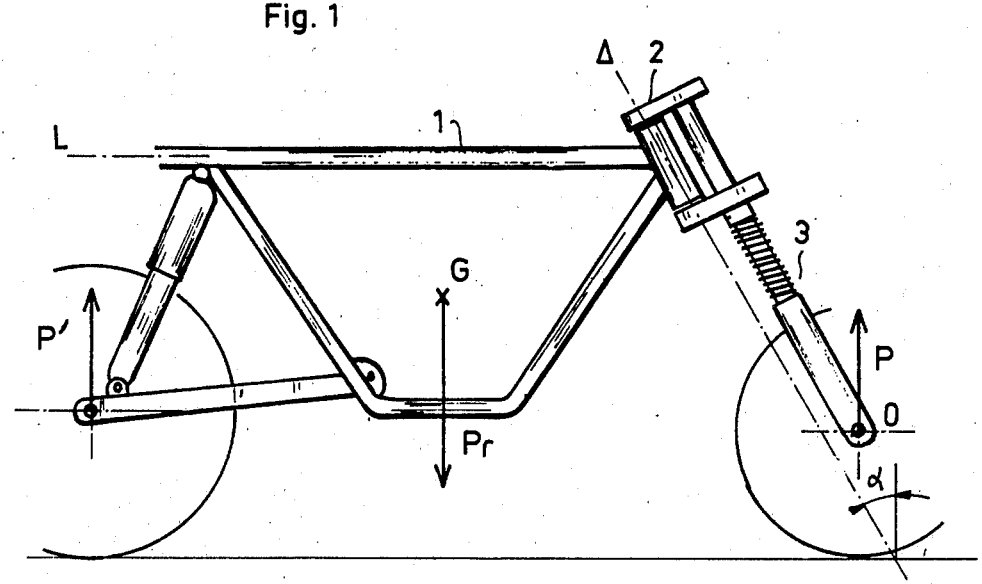
FIGS. 1, 2, and 3, previously discussed, schematically illustrate the operation of a telescopic suspension system of the classical type.
Figure 2:
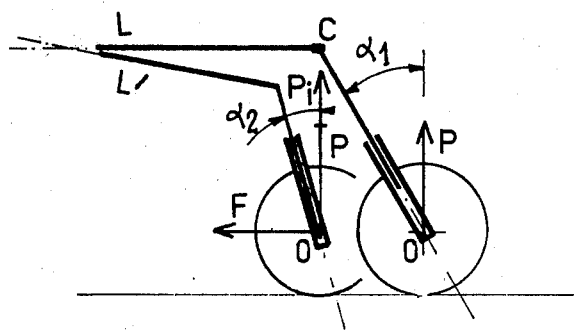

The suspension system illustrated by way of example in FIGS. 4–8 is adapted for use with a conventional type of motorcycle comprising a chassis 4 which carries the various elements constituting the vehicle (motor, tank, seat, . . . ) and handlebars 5 carried by a steering axle 6 journalled on the chassis 4. This axle 6 is shown in the example as vertical or substantially vertical, but could likewise be inclined. It should be noted that this ability to provide a vertical steering axle constitutes in practice an advantage as to comfort and steering precision.

The suspension system according to the invention comprises essentially the four following assemblies:

(a) a support frame 7 carrying at its lower portion the axle 8 of the front wheel 9 of the motorcycle;

(b) an upper frame 10 and a lower frame 11, each of these frames being journalled at their rear end to the chassis 4 and at their front end to the support frame 7;

(c) a shock absorber assembly comprising a shock absorber 12 which supports the lower frame 11 by means of connecting rods 13 and of a rocker 14; and (d) a steering connecting rod 15 adapted to allow for the maneuver of the support frame 7 around its axis of rotation to allow for the steering of the vehicle.

The support frame 7 can in particular comprise two rigid cross-braced arms 7a and 7b forming a fork at the lower portion of which is positioned the front wheel 9.

In the upper portion, these two arms 7a and 7b are connected by an axle carrying a swivel joint 16 through which the upper frame 10 is journalled.

At the intermediate portion, these two arms are in an analogous fashion connected by an axle carrying a swivel joint 17 through which the lower frame 11 is journalled.

Thus, by movement of the swivel joints 16 and 17, the support frame 7 can, on the one hand, pivot around its own axis D (defined by the line joining the swivel joints 16 and 17), and on the other hand, displace itself in the longitudinal median plane of the motorcycle along a path which is guided and dictated by the upper frame 10 and lower frame 11, these two frames forming a deformable quadrilateral with the support frame and the chassis. The caster angle α of the motorcycle is constituted by the angle of inclination of the axis D with respect to the vertical.

Connecting rod 15 makes it possible for the driver to control the pivoting movements of the support frame around the axis D without acting on the other system assemblies. This connecting rod is journalled, at the rear, on a bracket or flap 18 integral with the steering axle 6 connected to the handlebars and, in front, on a flap or bracket 19 integral with the support frame 7. As used herein, the term "bracket" is taken to mean simply the point at which the connecting rod is journalled. The rod is particularly positioned at an intermediate level between the upper frame 10 and lower frame 11 in a position such that this connecting rod is kinematically compatible with the deformable quadrilateral, i.e., that it has the same instantaneous center of rotation as the quadrilateral over the range utilized. One of ordinary skill in the art can easily determine the position and the length of this connecting rod for it to be compatible (particularly by construction of the Bobillier line). It should be noted that two specific instances of compatibility are constituted by a coaxiality of the connecting rod 15 with one or the other of the frames 10 or 11.

Furthermore, upper frame 10 and lower frame 11 are each situated in a transverse plane and has a generally triangular configuration, having a rear base formed by a transverse journal axle 20 or 21 on the chassis 4 and a front apex formed by the swivel joint journals 16 or 17 referred to above.

In such a system, the caster angle can easily be made pre-adjustable by providing at least one of the upper or lower frames 10 or 11 with adjustment means for its length.

For example, the upper frame 10 can be formed by a triangular plate which carries, on the one hand, on two lateral rear edges of its base, threaded shafts provided with lock nuts and journal bearings on the axle 21, and on the other hand, at its front or apex portion, with a threaded shaft provided with a lock nut and with the spherical cage of the swivel joint 16.

The lower frame 11 which, as will be seen, is of greater length than the upper frame 10, is constituted in the example by two tubular bars 11a and 11b which are positioned in a V-formation. They carry in an analogous fashion, at the rear, threaded shafts provided with lock nuts and swivel joint journals and, in front, with a threaded shaft provided with a lock nut and with a spherical cage of the swivel joint 17.

The frames 10 and 11 described above allow for the freedom of the support frame 7 to turn around its axis D without this rotational movement causing displacement of the frames. By maneuvering the handlebars 5 and as a consequence the connecting rod 15, the driver assures the steering of his machine by a rotation of the single support frame 7.

Furthermore, the frames 10 and 11 guide the displacement of the support frame 7 in the longitudinal median plane and impose a trajectory T to the axle 8 of the front wheel (assuming that the chassis is taken as the reference system). This trajectory T depends upon the dimensional parameters of the device, and a preferred example will be explained below.

The position of the axle 8 of the front wheel on this trajectory T is fixed by the shock absorber assembly (12, 13, 14). In the preferred embodiment shown, the shock absorber 12 comprises a coil spring whose oscillations are damped in a conventional fashion by a hydraulic or hydropneumatic shock absorber element. This shock absorber is positioned in the downward direction between a support 22 integral with the chassis 4 and the rocker 14, referred to above, journalled at the lower portion of the chassis. The connecting rods 13, two as shown in the example, connect the rocker 14 to the front portion of the lower frame 11.

The coil spring of the shock absorber 12 is thus connected to elastically maintain the lower frame 11, by compressing itself in the case of pivoting towards the top of this frame with respect to the chassis and by extending itself in the opposite situation. One thus achieves a progressive damping, making it possible to withstand heavy loads while having excellent flexibility at low loading.

The device as described previously achieves the results and advantages described below.

In the first place, the various elements of the suspension (shock absorber assembly 12, 13, 14, and frames 10 and 11) are not directly carried by the support frame 7 and do not pivot therewith during steering (contrary to that which occurs with conventional suspension systems). One thus considerably reduces the inertia involved in steering.

Furthermore, the handlebars 5 act on the support frame 7 by the interposition of the connecting rod 15, without being directly subjected to the suspension movements. One thus obtains a motorcycle which provides a much more enjoyable ride without the direct transmission into the arms of the driver of the suspension movements.

Additionally, as has been seen, the caster angle can be very easily pre-adjusted by the pilot to modify the controllability and the stability of the motorcycle as a function of the characteristics of the course over which it is to be used.

Also, the shock absorber 12, journalled between the chassis 4 and the rocker 14, is not the seat of any substantial flexional stresses, and the danger of crushing or prematurely wearing this element out is completely obviated.

Furthermore, the dimensional parameters of the device are advantageously provided in a fashion such that the trajectory T over which the axle 8 of the front wheel moves (the chassis being taken as the fixed reference point) has the shape of a portion of a C with an ascending portion directed towards the rear, an ascending portion which is approximately vertical, and an ascending portion directed toward the front. Such a trajectory is shown in FIGS. 7 and 8. For example, the dimensional parameters are set to satisfy the following conditions:

$$0.40 \leq (l_s/h) \leq 0.65$$

$$0.85 \leq (l_i/h) \leq 1.55$$

$$0.75 \leq (L/h) \leq 1.30$$

$$1.15 \leq (A/h) \leq 2.10$$

$$12° \leq \beta \leq 18°$$

where h is the distance separating the journal axles 20 and 21 of the frames 10 and 11 on the chassis 4;

L is the distance between the two swivel joints 16 and 17;

$l_s$ is the length of the upper frame (in projection on the longitudinal median plane);

$l_i$ is the length of the lower frame (under the same conditions);

A is the distance separating the axle 8 of the front wheel and the lower swivel joint 17; and $\beta$ is the angle of inclination towards the front with respect to the vertical of the line joining the axles 20 and 21.

FIG. 7 schematically illustrates three positions of the device, which make it possible to understand that the caster angle $\alpha$ varies little over the trajectory T (included between approximately 20° and 30° with the parameters set forth above). When the shock absorber 12 is compressed, the axle 8 of the front wheel moves along the trajectory T from the point $t_1$ to the point $t_2$; the caster angle $\alpha$ begins to slightly decrease and then to again slightly increase; this variation extends over a very narrow range, and negligibly affects the stability and the maneuverability of the motorcycle, which remain substantially unaffected.

Figure 3:
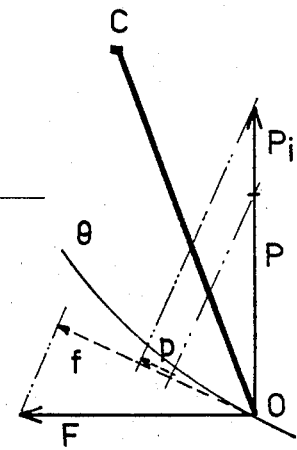
Figure 4:
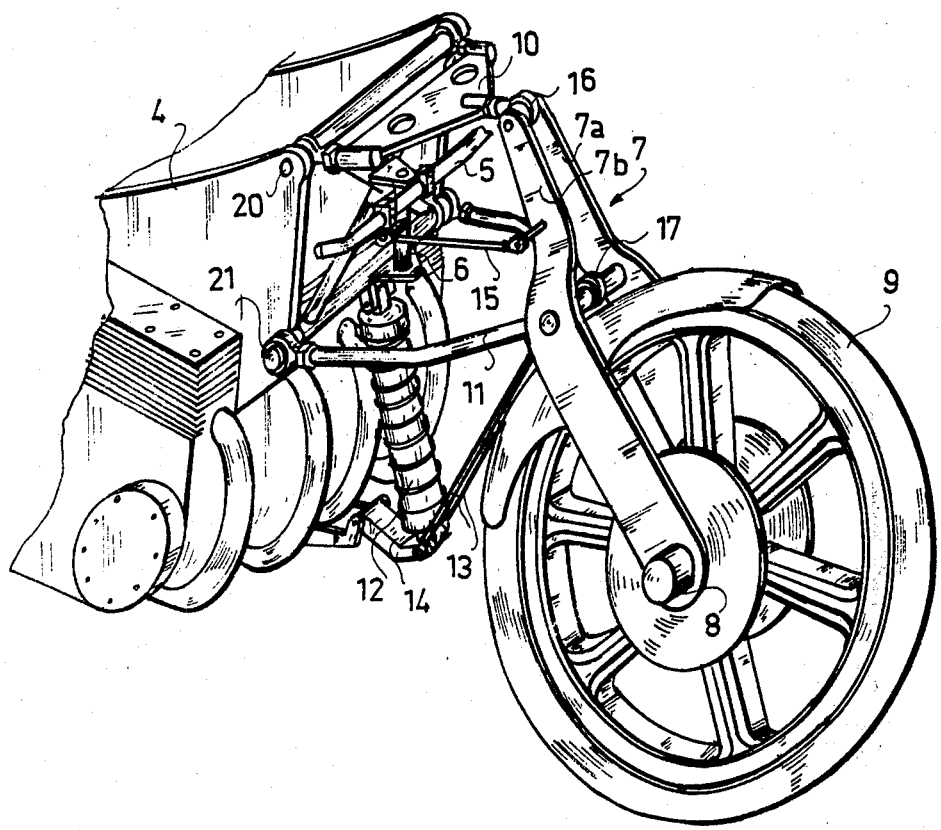
FIG. 4 is a perspective schematic view of an embodiment of the suspension system according to the invention, mounted on the front of a motorcycle.
Figure 5:
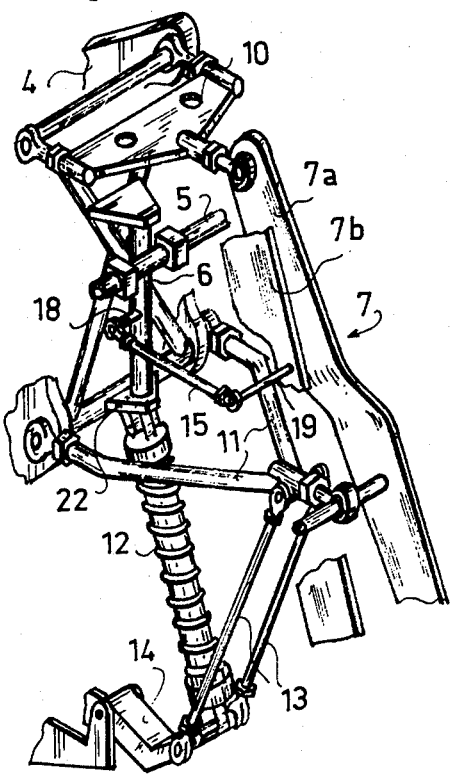
FIG. 5 is a schematic partial view of this system, making it possible to better understand the structure.
Figure 6:
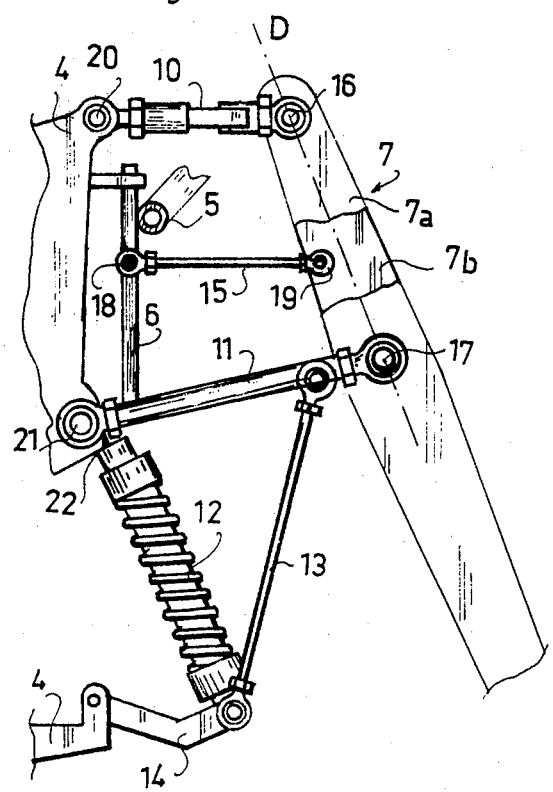
FIG. 6 is a profile view of the system.

FIG. 8 illustrates a force diagram under the same conditions as in FIG. 3 depicting the situation during braking for two different positions, I and II, over the trajectory T (for the gravitational forces, only the overload $P_i$ has been shown). For the position I which corresponds to a slight compression of the shock absorber, it is seen that the projection f of the horizontal braking force F is oriented in the same direction as the projection p of the overload $P_i$. These forces tend to increase the compression of the shock absorber, and to displace the axle 8 along the trajectory T in the direction of the arrow S.

On the contrary, for the position II, the projection f is oriented in the opposite direction with respect to the projection p, such that its effect is to oppose the latter and to add to that of the shock absorber to stabilize the axle 8 of the front wheel in an equilibrium position which is positioned substantially at the level of the vertical portion of the trajectory T.

Thus, the attitudinal variations of the motorcycle are considerably reduced during braking because the system possesses stable equilibrium positions in the course of braking which correspond to attitudes much closer to the attitude at rest than those of known systems. This occurs without blockage of the shock absorber, which remains ready to dampen the irregularities of the ground over which the cycle moves.

Furthermore, by adjusting their elasticity, the shock absorber means can be adapted to develop return forces on the support frame 7 such that the axle 8 of the front wheel is approximately situated at the level of the substantially vertical portion of the trajectory T in the case where the cycle is turning and is subjected, in addition to gravitational forces, to the inertial forces developed during turning.

As a result, the attitude of the motorcycle during turning or banking will be close to its attitude during braking. The braking which generally occurs at the start of a turn will thus find the motorcycle in a favorable attitude for negotiating the turn, and no significant change of attitude will intervene at the end of braking when the motorcycle begins the turn.

The value of the invention can thus be well appreciated in view of the fact that it eliminates the majority of defects found in conventional suspensions while nevertheless benefiting from a simple structure.

Of course, the invention is not limited to the specifics disclosed, and extends to all equivalent means and apparatus included within the scope of the claims.

What is claimed is:

1. A vehicle suspension system adapted for suspending the chassis of a cycle, such as a motorcycle or like vehicle, said system comprising:
    (a) a support frame, said support frame being adapted to receive a front wheel axle at the lower portion thereof, said support frame being movably mounted with respect to said chassis, both in the longitudinal median plane of said cycle as a result of movement of said suspension system as well as in rotation around an axis for purposes of steering said cycle;
    (b) control means for controlling the position of said support frame in the longitudinal median support plane, said control means positioned between said chassis and said support frame and being adapted to guide the displacement of said support frame in said longitudinal median support plane during movement of said suspension system, said control means being further adapted to guide said front wheel axle relative to said chassis along a trajectory having an ascending rearwardly directed portion, a substantially vertical intermediate portion, and an ascending frontwardly directed portion, said trajectory having a convexity directed rearwardly towards said chassis;
    (c) shock absorber means positioned to elastically maintain said support frame with respect to said chassis in said longitudinal median plane whereby said wheel axle moves along said trajectory, said trajectory being determined by said control means as a function of the forces being exerted on said cycle; and
    (d) an independent mechanical element connecting the support frame to handlebars whose orientation is controllable, said independent mechanical element being independent of said control means and being adapted to control the rotational position of the support frame around its axis without movement of said control means.

2. The vehicle suspension system as defined by claim 1 wherein said trajectory is generally C-shaped.

3. The vehicle suspension system as defined by claim 1 wherein said shock absorber means is adapted to provide reaction forces on said support frame whereby said wheel axle is positioned approximately at the level of said substantially vertical portion of said trajectory when said cycle is subjected to inertial forces, which develop during banking, in addition to normal gravitational forces.

4. The vehicle suspension system as defined by claim 1 wherein said independent mechanical element connecting said support frame to said handlebars comprises a connecting rod journalled between a bracket on a steering axle on which said handlebars are mounted and a bracket on said support frame.

5. The vehicle suspension system as defined by claim 1 wherein said control means comprises an upper frame journalled on said chassis, said upper frame being adapted to rotate around an upper transverse axis on said chassis, and a lower frame journalled on said chassis below said upper frame, said lower frame being adapted to rotate around a lower transverse axis on said chassis, said support frame being journalled to the front of each of said upper and lower frames by a corresponding swivel joint, each of said swivel joints being mounted at different levels whereby said support frame, said upper and lower frames, and said chassis, form a deformable quadrilateral.

6. The vehicle suspension system as defined by claim 5 wherein said shock absorber means comprises a shock absorber mounted on said chassis at one end of said shock absorber and on one of said upper or lower frames at the other end of said shock absorber.

7. The vehicle suspension system as defined by claim 5 comprising means for pre-adjusting the caster angle of said cycle.

8. The vehicle suspension system as defined by claim 7 wherein at least one of said upper or lower frames comprises means for adjusting its length whereby the caster angle of said cycle may be pre-adjusted.

9. The vehicle suspension system as defined by claim 5 wherein each of said upper and lower frames is adapted to be positioned in a transverse plane and has a generally triangular configuration including a base formed by each of said transverse axes on said chassis and an apex at the corresponding swivel joint on said support frame.

10. The vehicle suspension system as defined by claim 1 wherein said independent mechanical element connecting said support frame to said handlebars comprises a connecting rod journalled between a bracket on a steering axle on which said handlebars are mounted and a bracket on said support frame and wherein said control means comprises an upper frame journalled on said chassis, said upper frame being adapted to rotate around an upper transverse axis on said chassis, and a lower frame journalled on said chassis below said upper frame, said lower frame being adapted to rotate around a lower transverse axis on said chassis, said support frame being journalled to the front of each of said upper and lower frames by a corresponding swivel joint, each of said swivel joints being mounted at different levels whereby said support frame, said upper and lower frames, and said chassis, form a deformable quadrilateral, and wherein said connecting rod is positioned at a level intermediate said upper and lower frames and is connected whereby said connecting rod is kinematically compatable with said quadrilateral.

11. The vehicle suspension system as defined by claim 1 wherein said control means comprises an upper frame journalled on said chassis, said upper frame being adapted to rotate around an upper transverse axis on said chassis, and a lower frame journalled on said chassis below said upper frame, said lower frame being adapted to rotate around a lower transverse axis on said chassis, said support frame being journalled to the front of each of said upper and lower frames by swivel joints, each of said swivel joints being mounted at different levels whereby said support frame, said upper and lower frames, and said chassis, form a deformable quadrilateral, and wherein said shock absorber means comprises a shock absorber mounted on a rocker attached to said chassis at one end and on one of said upper or lower frames at the other end of said shock absorber, said shock absorber comprising a coil spring positioned to elastically maintain said frame to which said shock absorber is connected whereby said coil spring is in compression when said upper or lower frame to which said shock absorber is connected is raised relative to said chassis and is in extension when said upper or lower frame to which said shock absorber is connected is lowered relative to said chassis.

12. The vehicle suspension system as defined by claim 11 further comprising at least one connecting rod connecting said rocker to the front of said lower frame.

13. The vehicle suspension system as defined by claim 1 wherein said control means comprises an upper frame journalled on said chassis, said upper frame being adapted to rotate around an upper transverse axis on said chassis, and a lower frame journalled on said chassis below said upper frame, said lower frame being adapted to rotate around a lower transverse axis on said chassis, said support frame being journalled to the front of each of said upper and lower frames by a corresponding swivel joint, each of said swivel joints being mounted at different levels whereby said support frame, said upper and lower frames, and said chassis form a deformable quadrilateral, and wherein said upper frame, said lower frame, and said support frame are positioned to satisfy the following conditions:

$$0.40 \leq (l_s/h) \leq 0.65$$

$$0.85 \leq (l_i/h) \leq 1.55$$

$$0.75 \leq (L/h) \leq 1.30$$

$$1.15 \leq (A/h) \leq 2.10$$

$$12° \leq \beta \leq 18°$$

wherein h is the distance separating said upper and lower transverse axes;
L is the distance between said swivel joints;
$l_s$ is the length of the upper frame;
$l_i$ is the length of the lower frame;
A is the distance separating said axle and the swivel joint on said lower frame; and
$\beta$ is the angle of inclination towards the front with respect to the vertical of the line joining the upper and lower transverse axes.

14. A vehicle suspension system adapted for suspending the chassis of a cycle, such as a motorcycle or like vehicle, said system comprising:

(a) a support frame, said support frame being adapted to receive a front wheel axle at the lower portion thereof, said support frame being movably mounted with respect to said chassis, both in the longitudinal median plane of said cycle, resulting from movement of said suspension system, and in rotation around an axis, for purposes of steering said cycle;

(b) control means for controlling the position of said support frame, in the longitudinal median support plane, said control means positioned between said chassis and said support frame and being adapted to guide the displacement of said support frame, in said longitudinal median support plane, during movement of said suspension system, said control means being further adapted to guide said front wheel axle relative to said chassis along a trajectory having an ascending rearwardly directed portion, a substantially vertical intermediate portion, and an ascending frontwardly directed portion, said control means further comprising an upper frame adapted to be journalled on said chassis, said upper frame being adapted to rotate around an upper transverse axis on said chassis, and a lower frame adapted to be journalled on said chassis below said upper frame, said lower frame being adapted to rotate around a lower transverse axis on said chassis, said support frame being journalled to the front of each of said upper and lower frames by swivel joints, each of said swivel joints being mounted at different levels, whereby said support frame, said upper and lower frames, and said chassis form a deformable quadrilateral;

(c) shock absorber means positioned to elastically maintain said support frame with respect to said chassis in said longitudinal median plane so that said front wheel axle moves along said trajectory, said trajectory being determined by said control means as a function of the forces being exerted on said cycle, said shock absorber means comprising a shock absorber mounted on a rocker attached to the chassis at one end of said shock absorber, and on one of said upper or lower frames at the other end of said shock absorber, said shock absorber further comprising a coil spring positioned to elastically maintain said frame to which said shock absorber is connected, whereby said coil spring is in compression when said upper or lower frame to which said shock absorber is connected is raised relative to said chassis, and is in extension when said upper or lower frame to which said shock absorber is connected is lowered relative to said chassis, said system further comprising at least one connecting rod connecting said rocker to the front of said lower frame; and (d) an independent mechanical element connecting the support frame to handlebars whose orientation is controllable, said independent mechanical element being independent of said control means and being adapted to allow for the control of the rotational position of the support frame around its axis, without movement of said control means.

* * * * *

UNITED STATES PATENT AND TRADEMARK OFFICE
CERTIFICATE OF CORRECTION

PATENT NO. : 4,388,978
DATED : June 21, 1983
INVENTOR(S) : Claude FIOR

It is certified that error appears in the above-identified patent and that said Letters Patent is hereby corrected as shown below:

At Column 1, line 8, delete "to" and substitute ---for--- therefor.

At Column 1, line 37, delete "center" and substitute ---caster--- therefor.

At Column 1, line 39, after "vehicle" insert ---occur,---.

At Column 8, line 32, before "18°" insert --- $\leq$ ---.

In the Claims, at Column 11, line 13, "compatable" should read ---compatible---.

Signed and Sealed this

Seventeenth Day of January 1984

[SEAL]

Attest:

GERALD J. MOSSINGHOFF

Attesting Officer

Commissioner of Patents and Trademarks